(12) United States Patent
Engelhardt et al.

(10) Patent No.: US 6,690,511 B2
(45) Date of Patent: Feb. 10, 2004

(54) OPTICAL ARRANGEMENT FOR THE ILLUMINATION OF SPECIMENS FOR CONFOCAL SCANNING MICROSCOPES

(75) Inventors: Johann Engelhardt, Bad Schoenborn (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 91 days.

(21) Appl. No.: 09/948,272

(22) Filed: Sep. 6, 2001

(65) Prior Publication Data

US 2002/0030884 A1 Mar. 14, 2002

(30) Foreign Application Priority Data

Sep. 8, 2000 (DE) .......................................... 100 44 636

(51) Int. Cl.[7] .............................................. G02B 21/06
(52) U.S. Cl. ...................... 359/385; 359/368; 359/214; 372/6
(58) Field of Search ................................. 359/368, 385, 359/386, 389, 212, 213, 214; 372/6

(56) References Cited

U.S. PATENT DOCUMENTS

| | | | |
|---|---|---|---|
| 5,161,053 A | 11/1992 | Dabbs | 359/384 |
| 5,887,009 A * | 3/1999 | Mandella et al. | 372/6 |
| 6,201,608 B1 * | 3/2001 | Mandella et al. | 356/491 |
| 6,351,325 B1 * | 2/2002 | Mandella et al. | 359/210 |
| 6,441,356 B1 * | 8/2002 | Mandella et al. | 250/201.3 |

FOREIGN PATENT DOCUMENTS

EP         0495930         4/1999

* cited by examiner

*Primary Examiner*—Mark A. Robinson
(74) *Attorney, Agent, or Firm*—Davidson, Davidson & Kappel, LLC

(57) ABSTRACT

The present invention concerns an optical arrangement for the illumination of specimens (1) for confocal scanning microscopes, having an illuminating beam path (2) and at least one light source (4), and is intended to make possible an efficient illumination of specimens in a confocal scanning microscope while decoupling mechanical vibrations from the confocal scanning microscope, the optical arrangement being intended to be economical and low-maintenance. The optical arrangement according to the present invention is characterized in that the light of the light source (3) is coupled into a fiber (4) in which laser transitions can be induced; and that at least the laser light induced in the fiber (4) serves for specimen illumination.

17 Claims, 4 Drawing Sheets

OPTICAL ARRANGEMENT FOR THE ILLUMINATION OF SPECIMENS FOR CONFOCAL SCANNING MICROSCOPES

CROSS REFERENCE TO RELATED APPLICATIONS

This invention claims priority of the German patent application 100 44 636.1 which is incorporated by reference herein.

FIELD OF THE INVENTION

The present invention concerns an optical arrangement for the illumination of specimens for confocal scanning microscopes, having an illuminating beam path and at least one light source.

BACKGROUND OF THE INVENTION

Optical arrangements of the generic type have been known from practical use for some time; merely by way of example, the reader is referred to EP 0 495 930, which discloses an optical arrangement for the illumination of specimens for confocal scanning microscopes in which fluorescent specimens can be excited to fluoresce in the confocal scanning microscope with a single laser that exhibits multiple emission wavelengths. Concretely, this involves an argon-krypton laser.

Also known, from U.S. Pat. No. 5,161,053, is a confocal microscope in which light of an external light source is transported to the confocal scanning microscope with the aid of a glass fiber. It is thereby possible, in particular, for the vibrations induced by the laser light source (principally from cooling systems or fans) to be mechanically decoupled from the optical beam path of the confocal scanning microscope.

The generic arrangements have problems, however. For example, the argon-krypton laser known from EP 0 495 930 is very complex and expensive. It moreover requires a great deal of maintenance, creating difficulties for the continuous use of confocal scanning microscopes.

In the confocal scanning microscope known from U.S. Pat. No. 5,161,053, the light output remaining for the illumination of specimens after passing through a glass fiber provided for light transport is reduced, as a result of coupling-in and absorption losses, to approx. 50% of the light output emitted by the light source. Simply to achieve the goal of mechanically decoupling the confocal scanning microscope from the vibrations induced by the light source, it is accordingly necessary to use a light-guiding fiber and a light source; and the light source must have available at least twice the light output needed for illumination of the specimens arranged in the confocal scanning microscope. This, too, requires the use of a laser system that is more complex and more expensive than would actually be necessary.

As an alternative to the aforementioned possibilities known from the existing art for the illumination of specimens for confocal scanning microscopes, semiconductor lasers can be used. Because of their small and lightweight construction, these can be arranged directly on the confocal scanning microscope. They require a complex optical system to adapt the emitted light beam, however, since semiconductor lasers have an astigmatic beam cross section as a result of their design, and the light bundle emitted from the semiconductor laser usually exhibits poor beam quality. Because the wavelength range is narrow, the emission spectrum of a semiconductor laser is of very limited suitability for flexible use in confocal scanning microscopy, so that for simultaneous illumination with light of several wavelengths, several semiconductor lasers must be combined into one illuminating beam. This would also require a complex optical system, so that this, too, results in high costs. The same is also true for the use of compact solid-state lasers. In addition, semiconductor lasers and solid-state lasers must be cooled, which generally entails complex measures and also disruptive vibrations directly on the confocal scanning microscope.

SUMMARY OF THE INVENTION

It is therefore the object of the present invention to describe and further develop an apparatus which makes an efficient illumination of specimens in a confocal scanning microscope possible and the optical arrangement being intended to be economical and low-maintenance.

The object of the present invention is achieved by an optical arrangement for the illumination of a specimens comprising:

a confocal scanning microscope with at least one light source generating light for the illumination of the specimen, wherein the at least one light source defines an illuminating beam path, a fiber defining a light entrance and a light exit and having a core, wherein the light of the light source is coupled into the fiber via the light entrance, and laser transitions induced in the fiber and the light exiting the fiber via light exit serves for specimen illumination.

It is a further object of the present invention to describe and further develop an apparatus which makes an efficient illumination of specimens in a confocal scanning microscope possible and the optical arrangement being intended to be economical and low-maintenance while decoupling mechanical vibrations from the confocal scanning microscope The above object of is achieved by An optical arrangement for the illumination of a specimens comprising:

a confocal scanning microscope with at least one light source generating light for the illumination of the specimen, wherein the at least one light source defines an illuminating beam path, an up-conversion fiber laser defining a light entrance and a light exit and having a core, wherein the light of the light source is coupled into the fiber laser via the light entrance, laser transitions induced in the fiber and the light exiting the fiber laser via light exit serves for specimen illumination, means for selecting the light of different wavelengths is provided after light exit of the fiber laser, and an excitation pinhole positioned after the means for selecting.

What has been recognized according to the present invention is firstly that the use of a light-guiding fiber to transport the light of a laser light source to the confocal scanning microscope makes possible effective decoupling of mechanical vibrations. The optical arrangement according to the present invention for the illumination of specimens therefore has a fiber that, however, does not serve only to transport light of a light source to the confocal scanning microscope; rather light is generated in the fiber and serves for specimen illumination. For that purpose, laser transitions are induced with the aid of the light of a light source coupled into the fiber, thereby generating the laser light serving for specimen illumination.

In a particularly preferred embodiment, the exit end of the fiber serves as the point light source of the confocal scanning microscope. The fiber defines a light entrance and a light exit. As a result, the light exit directly constitutes a point-like light source, the beam properties of the light leaving the light exit of the fiber being rotationally symmetrical with respect to the fiber axis in the light exit region.

An excitation pinhole, which otherwise is usually arranged in a confocal scanning microscope in a plane optically corresponding to the focal plane of the microscope objective being used, is not provided for the light of the fiber laser. Because of the almost ideal beam properties of the fiber laser, an excitation pinhole is thus not necessary; this advantageously reduces costs. The term "fiber laser" will be used hereinafter to refer to the fiber and to at least two mirror surfaces that reflect the laser light induced in the fiber. An amplification of the laser light induced in the fiber can accordingly be achieved by multiple reflection at the mirror-coated surfaces and multiple passes of the induced laser light through the fiber.

For a further reduction in the optical components arranged in the beam path, the light exit could be embodied to be coated in partially reflective fashion, so that said light exit serves as the resonator mirror of the fiber laser. The partially reflective coating of the light exit is configured to be reflective principally for light of the wavelengths of the laser transitions of the fiber. At least the light exit facing toward the microscope could also be embodied to be reflective for the light of the light source coupled into the fiber, so that the light of the light source is not coupled into the confocal scanning microscope. Very generally, both the light entrance and the light exit could be partially reflectively coated, so that only the fiber, with its two mirror-coated ends, is the active laser medium and laser resonator.

In a concrete embodiment, the fiber could be embodied as an up-conversion fiber laser that comprises a rare earth-doped core. In particular, the active medium of the fiber laser could comprise praseodymium-, erbium-, and/or thulium-doped heavy-metal fluoride glasses. In a preferred embodiment, the active medium of the fiber laser comprises ZBLAN (53 $ZrF_4$-20 $BaF_2$-4 $LaF_3$-3 $AlF_3$-20 NaF) or ZBYA (50 $ZrF_4$-33 $BaF_2$-10 $YF_3$-7 $AlF_3$), the factor preceding the individual element compounds representing the proportion, as a molar percentage, of the individual element compounds.

The fiber laser could also be a double-core fiber laser. A double-core fiber laser has two glass fibers arranged concentrically with one another, the outer glass fiber with the greater diameter serving as light-guiding medium for the light coupled into the fiber (pumping light). The inner, smaller-diameter fiber arranged concentrically with the outer fiber represents the active medium of the fiber laser.

In a preferred embodiment, the core diameter of the fiber is configured in such a way that the emitted light has a rotationally symmetrical beam profile. Preferably this is a Gaussian profile; in particular, a $TEM_{00}$ profile is present.

In particularly advantageous fashion, the exit aperture of the fiber laser is adapted to the microscope optical system. The result of this is that the entrance pupil of the microscope objective is optimally illuminated, so that a diffraction-limited illumination pattern and, associated therewith, an optimum optical resolution are achieved.

A diode, semiconductor, solid-state, and/or gas laser could be provided as the pumping laser for the fiber. The beam divergence of the pumping laser is, in this context, also adapted to the entrance aperture of the fiber laser or is to be adapted thereto with a corresponding optical system. The use of a gas laser or of an air-cooled solid-state laser as pumping laser decouples the vibrations produced by the cooling system from the confocal scanning microscope in particularly advantageous fashion.

In particular with regard to biomedical applications, the emission wavelengths of the fiber laser lie in the visible region. The fluorochromes usually used therein can thus be excited to fluoresce. In particularly advantageous fashion, the fiber laser has several emission wavelengths that preferably are emitted simultaneously. As a result, different fluorochromes can be excited to fluoresce simultaneously, advantageously contributing to the application versatility of a confocal scanning microscope that is equipped with the optical arrangement according to the present invention for the illumination of specimens. It may optionally be necessary, for the simultaneous generation of laser light of different wavelengths, for pumping light of several light sources or excitation wavelengths to be coupled into the fiber. For that purpose, the light of the light sources must be suitably combined before being coupled into the fiber.

In a preferred embodiment, the emission wavelength or wavelengths of the fiber laser is or are tunable. It is thereby possible to excite different fluorescent dyes whose excitation wavelengths lie in the tuning range of the fiber laser. In particular, an emission wavelength of the fiber laser can thereby be adapted to the absorption spectrum of a fluorescent dye.

In a concrete embodiment, means for selecting light of different wavelengths are provided. The means for selecting light of different wavelengths could be arranged between the fiber laser and the microscope. The means could be configured as an electrooptical or acoustooptical component, concretely as an AOTF (acoustooptical tunable filter), AOD (acoustooptical deflector), EOD (electrooptical deflector), or AOBS (acoustooptical beam splitter). The means for selecting light of different wavelengths could comprise a color filter.

In an alternative embodiment, a means for selecting light of different wavelengths acts in the resonator of the fiber laser. The means could comprise a tiltable etalon, a grating arrangement, or at least one birefringent plate. As a function of the arrangement of the means in the resonator of the fiber laser, only one or several wavelengths are allowed to pass to the optical amplification process in the fiber laser; the remaining possible wavelengths are suppressed, without amplification, in the fiber laser. With regard to the birefringent plate, be it noted that the latter is rotatably mounted, and its interface is, in each rotational position, at a Brewster angle to the light beam in the resonator. A birefringent plate arranged in this fashion is known as a birefringent filter.

In a concrete embodiment, to block out the light coupled into the fiber, a blocking filter for that light is provided between the fiber laser and microscope. The light coupled into the fiber to induce the laser transitions is therefore not used to illuminate the specimens. This filter could be an appropriate bandpass filter or dichroic filter.

In a particularly preferred embodiment, an apparatus for compensating for light output fluctuations of the fiber laser is provided. Light output fluctuations can be caused either by light output fluctuations of the light source whose light is coupled into the fiber, or by laser operation in the fiber itself. The apparatus could have a light output sensor that detects the light output instantaneously emerging from the fiber laser, a control unit that compares the reference output to the actual output, and an adjusting unit that adjusts a corresponding component. In a preferred embodiment, the apparatus regulates the light coupled into the fiber laser. For that purpose, provision is made for the apparatus to comprise an AOTF, AOD, EOD, or an LCD attenuator.

For simple and reproducible installation of the fiber laser on the confocal scanning microscope, provision is made for at least one fiber end of the fiber laser to be equipped with a fiber connector. This fiber connector could be standardized or could correspond to one of the usually obtainable fiber connectors. Ultimately a user of the confocal scanning microscope can quickly and easily exchange different fiber lasers that have the same fiber connector; in particularly advantageous fashion, this expands application versatility.

BRIEF DESCRIPTION OF THE DRAWINGS

There are various ways of advantageously embodying and developing the teaching of the present invention. In conjunction with the explanation of the preferred exemplary embodiments of the invention with reference to the drawings, an explanation is also given of generally preferred embodiments and developments of the teaching. In the drawings.

DETAILED DESCRIPTION OF THE INVENTION

Figure 1:
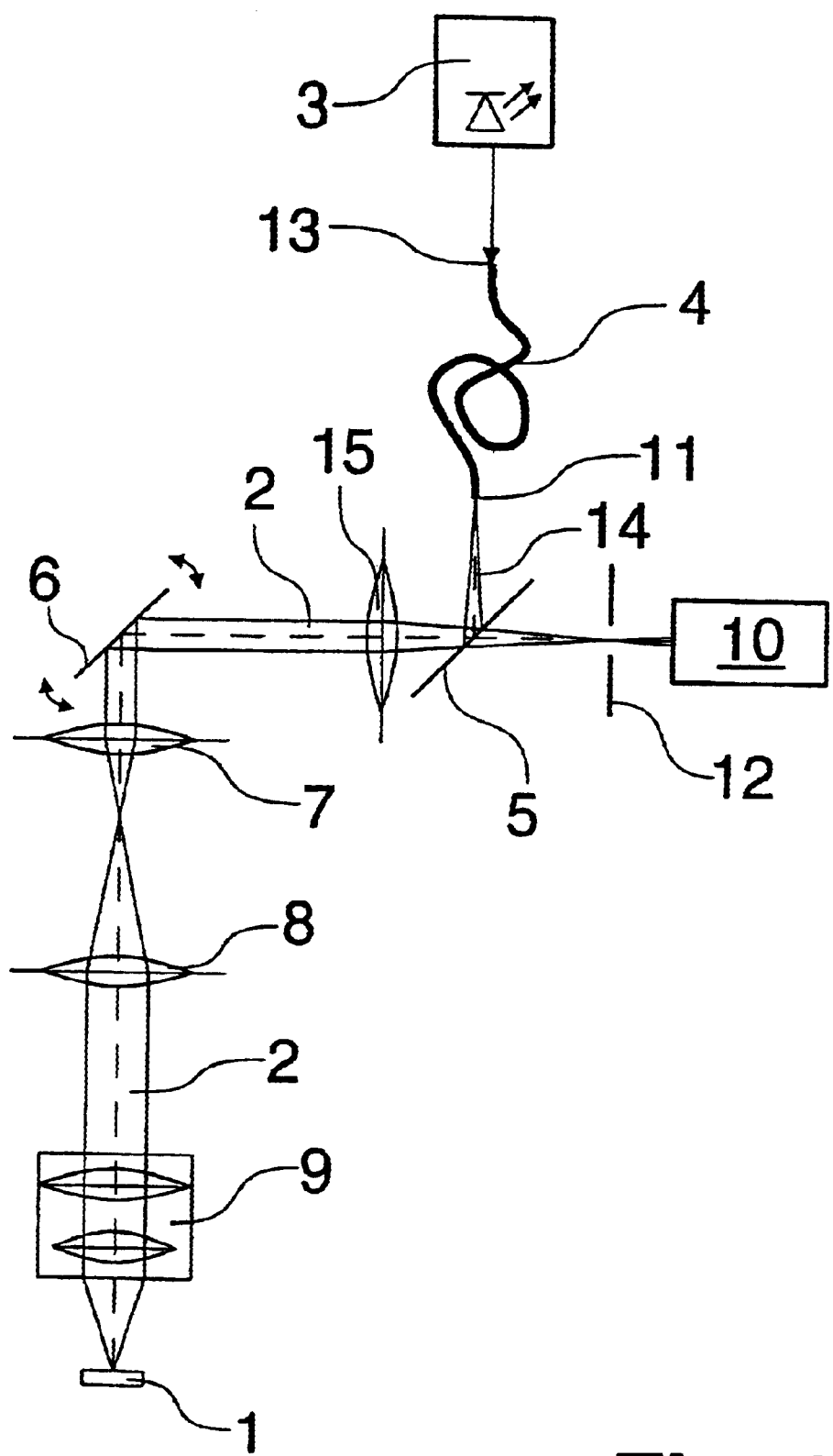
FIG. 1 schematically depicts a first exemplary embodiment of an optical arrangement according to the present invention for the illumination of specimens for a confocal scanning microscope.

FIG. 1 shows an optical arrangement for the illumination of a specimen 1 for a confocal scanning microscope, having an illuminating beam path 2 and a light source 3.

According to the present invention, the light of light source 3 couples into a fiber 4. Laser transitions are thereby induced in fiber 4. Both the laser light induced in fiber 4 and the light of light source 3 serve to illuminate specimens 1.

The illuminating light is reflected at dichroic beam splitter 5 to beam deflection apparatus 6, where the illuminating light beam is scanned in two directions that are substantially perpendicular to one another. The light deflected by beam deflection apparatus 6 is focused via an intermediate image into specimen 1 by means of lenses 7, 8 of microscope objective 9. A portion of the fluorescent light, induced by the illuminating light, of the fluorochromes specifically marked in specimen 1 is collected by microscope objective 9 and conveyed in the opposite direction to dichroic beam splitter 5. Because its wavelength is different from that of the illuminating light, the fluorescent light passes through dichroic beam splitter 5 and is detected by detector 10.

Light exit 11 of fiber 4 serves as the point light source of the confocal scanning microscope. Light exit 11 of fiber 4 is thus arranged in optical correspondence with detection pinhole 12; both light exit 11 of fiber 4 and detection pinhole 12 correspond optically to the focus of microscope objective 9.

Figure 2:
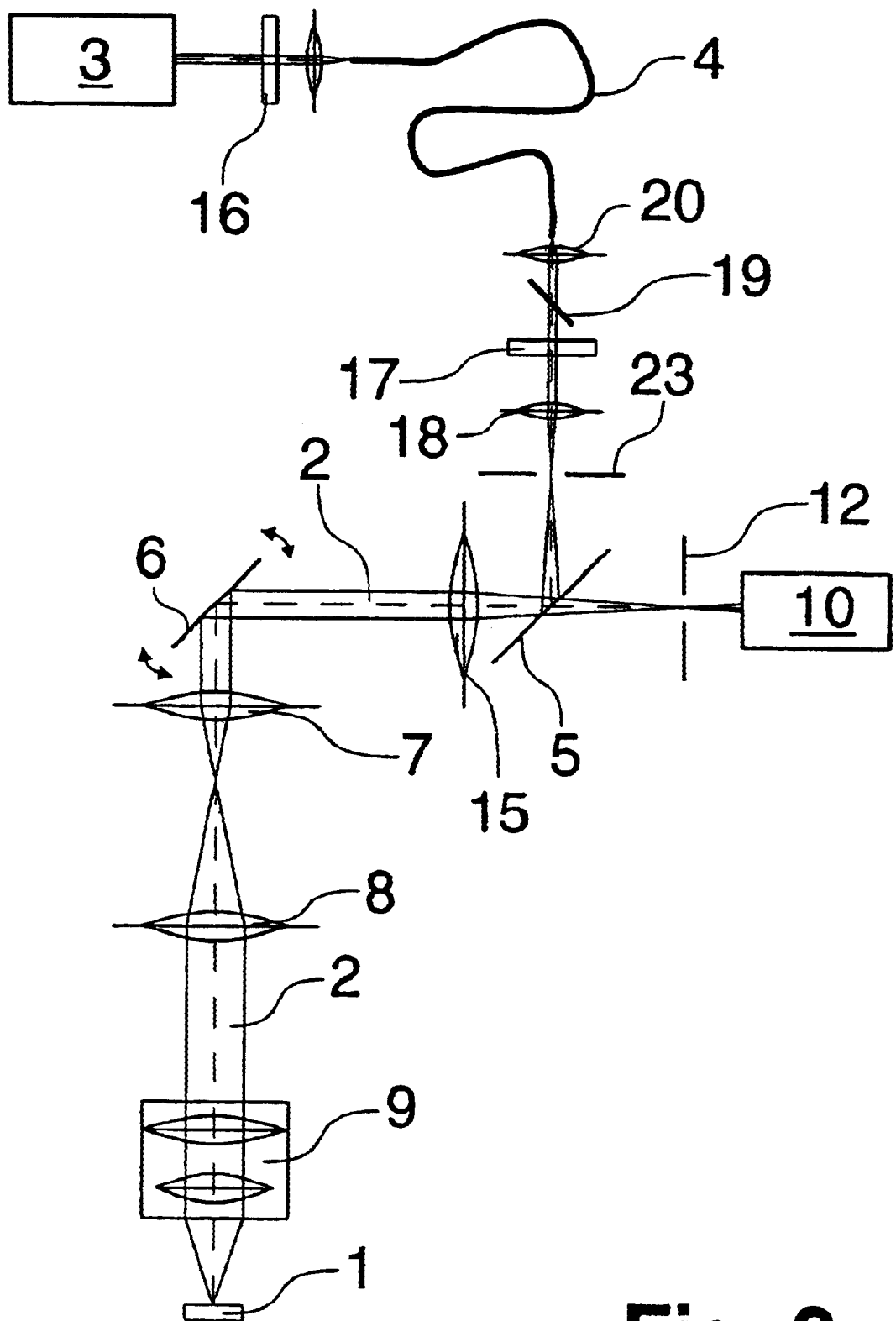
FIG. 2 schematically depicts a second exemplary embodiment of an optical arrangement according to the present invention for the illumination of specimens for a confocal scanning microscope.
Figure 3:
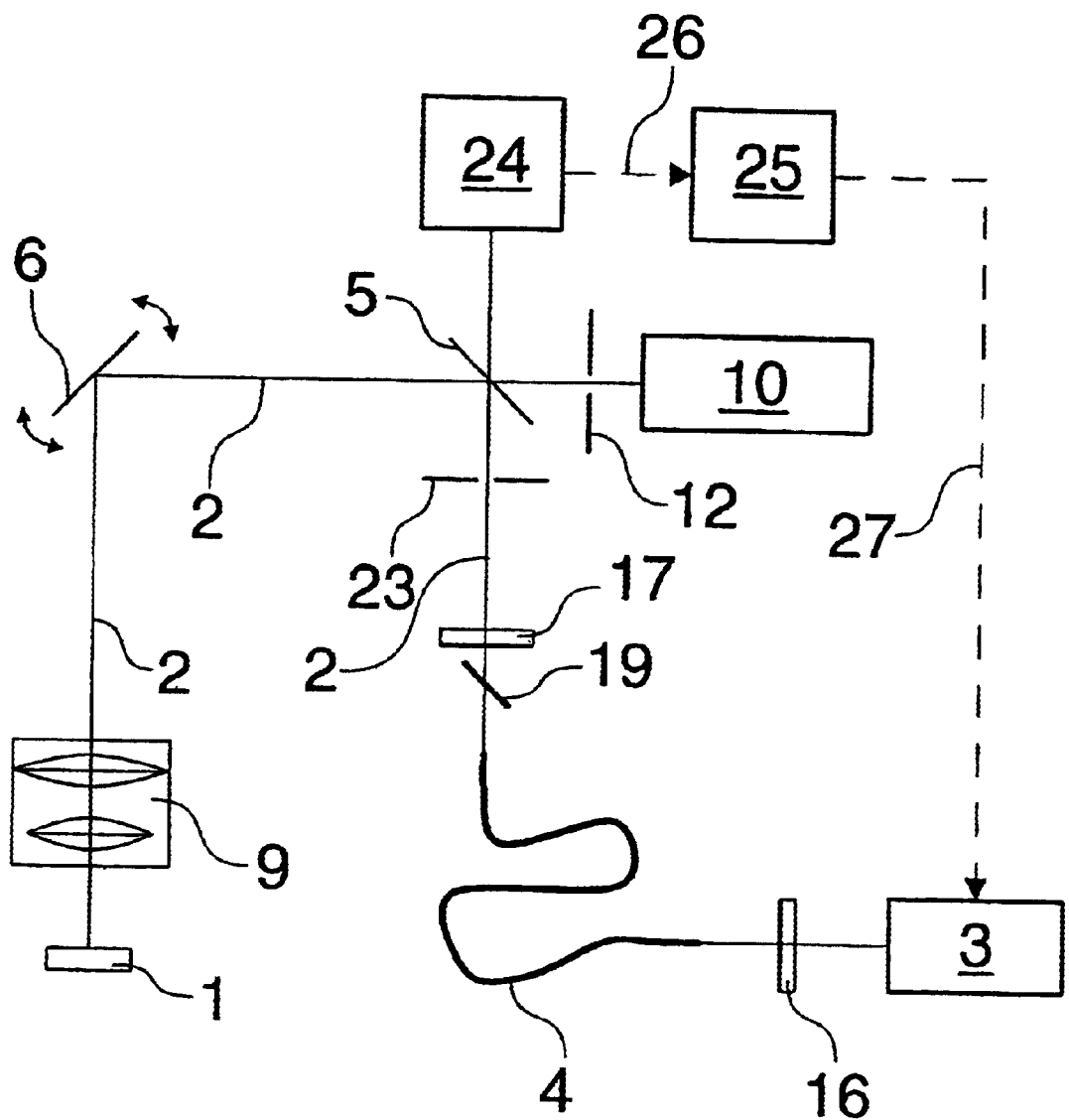
FIG. 3 schematically depicts a development of the exemplary embodiment of FIG. 2.
Figure 4:
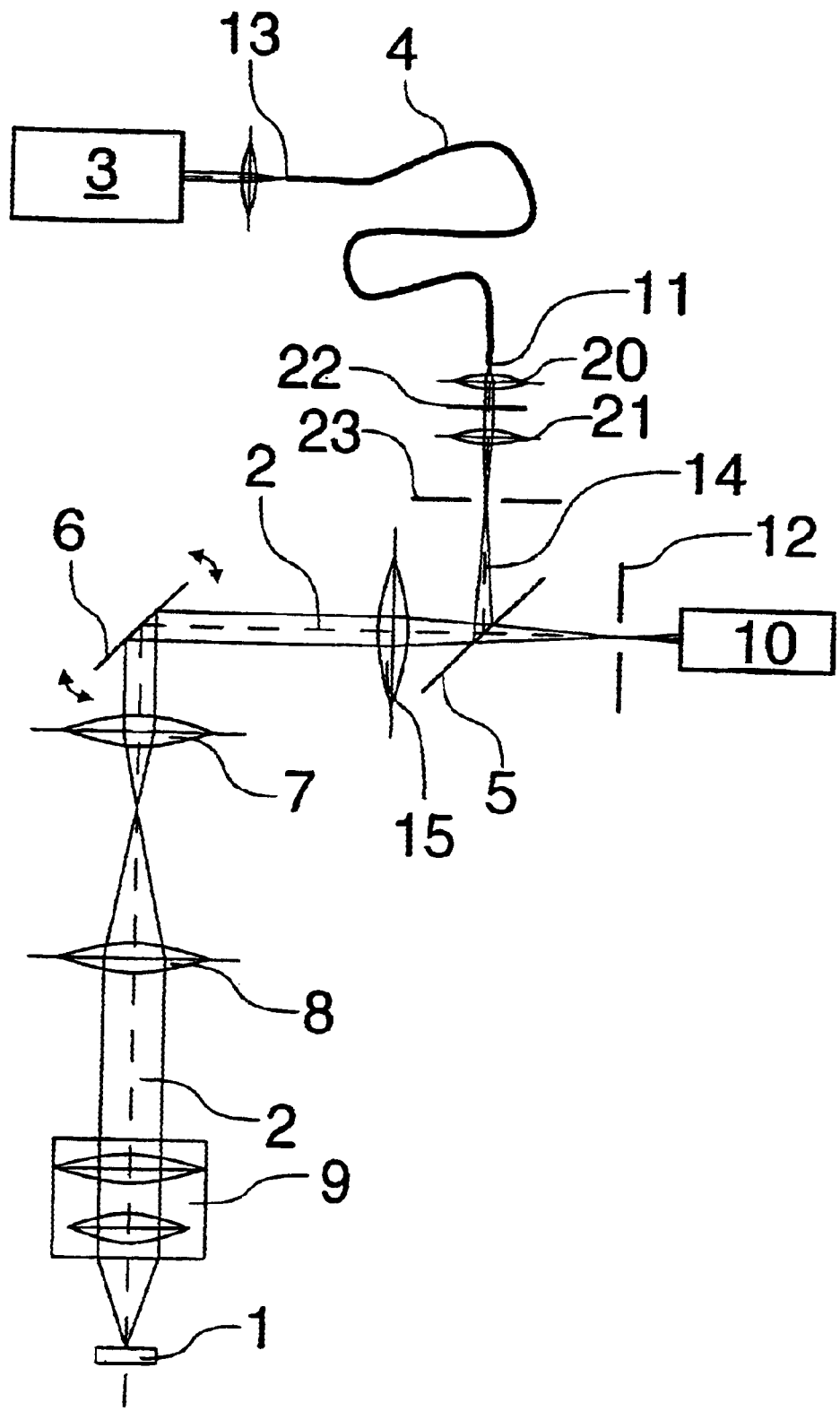
FIG. 4 shows a further exemplary embodiment of an optical arrangement according to the present invention for the illumination of specimens for a confocal scanning microscope.

It is also evident from FIG. 1 that an excitation pinhole is not provided, although such is the case in FIGS. 2 through 4 with reference character 23.

Light exit 11 facing toward the microscope, and light entrance 13 facing toward light source 3, are coated in partially reflective fashion and thus configured as resonator mirrors for fiber 4 and for the fiber laser.

Fiber 4 of FIG. 1 has an exit aperture 14 that is adapted to the microscope optical system, i.e. exit aperture 14 is adapted to lens 15.

Light source 3 of FIG. 1 is configured as a diode laser, and acts as pumping laser for the laser transitions induced in fiber 4.

Fiber 4 emits light of several wavelengths, all of which lie in the visible region. Emission of the light of different wavelengths takes place simultaneously.

FIG. 2 shows an alternative exemplary embodiment in which light of light source 3 is again coupled into a fiber 4. Here again, laser transitions are induced in fiber 4, the light thereby induced being reflected back into fiber 4 at each of the two resonator mirrors 16, 17. The light emerging from the fiber laser at resonator mirror 17, which is configured to be partially reflective, is adapted by means of lens 18 to the aperture of the microscope optical system. The remainder of the beam path of the confocal scanning microscope of FIG. 2 corresponds to that of FIG. 1.

It is evident from FIG. 2 that means 19 for the selection of light of different wavelengths is provided. Means 19 is arranged in the resonator of the fiber laser, i.e. means 19 is arranged between resonator mirror 17 and the exit end of fiber 4 facing toward the microscope. Means 19 is a birefringent filter, i.e. a birefringent plate that is arranged at the Brewster angle with respect to the beam axis of the laser light.

The birefringent plate is arranged rotatably; specifically, the rotation axis of the birefringent plate coincides with the optical axis of the light proceeding in that region.

In the exemplary embodiment of FIG. 2 as well, both the light of light source 3 and the laser light induced by light source 3 in fiber 4 are used for the illumination of specimen 1.

FIG. 4 shows an exemplary embodiment comparable to FIG. 2, the two exit ends 11, 13 of fiber 4 being of partially reflective configuration so that no further resonator mirrors are provided here. Provided between the two lenses 20, 21 is a blocking filter 22 that prevents light of laser light source 3 from coupling into the confocal scanning microscope. Accordingly, only the laser light induced in fiber 4 is used for the illumination of specimen 1.

It is evident from FIGS. 2 through 4 that an excitation pinhole 23 is arranged in optical correspondence both with detection pinhole 12 and with the focus of microscope objective 9. Detection pinhole 12 accordingly acts as a confocal point light source.

FIG. 3 shows a development of FIG. 2 in which an apparatus 24, 25 for compensating for light output fluctuations of the fiber laser is provided. The light of light source 3 that is coupled into fiber 4 is controlled by apparatus 24, 25. The light coupled into the confocal scanning microscope, which passes through excitation pinhole 23, is for the most part reflected at dichroic beam splitter 5 toward beam deflection apparatus 6. A small portion of the exciting light, however, passes through dichroic beam splitter 5 and arrives at light output detector 24. The latter, via connection 26, supplies a corresponding signal to control unit 25 of the apparatus for compensating for light output fluctuations of the fiber laser. Via connecting line 27, control unit 25 adjusts the emission output of light source 3, which in FIG. 3 is configured as a diode laser.

In conclusion, be it noted very particularly that the exemplary embodiments discussed above serve merely to describe the teaching claimed, but do not limit it to the exemplary embodiments.

What is claimed is:

1. A confocal scanning microscope comprising:
   at least one light source;
   a fiber defining a light entrance and a light exit and having a core, wherein the light of the light source is coupled into the fiber via the light entrance, laser transitions being induced in the fiber, light exiting the fiber via a light exit, the light exit defining a point light source, light of the point light source defining an illuminating light beam adapted for specimen illumination;
   a beam deflection apparatus configured to scan the illuminating light beam in two directions that are substantially perpendicular to one another;
   a dichroic beam splitter configured to couple the light of the point light source into an illuminating beam path and direct the illuminating light beam to the beam deflection apparatus so as to form a deflected light beam;
   a microscope objective configured to focus the deflected light beam, wherein the dichroic beam splitter, the beam deflection apparatus and the microscope objective are disposed in the illuminating beam path; and
   a detector arranged downstream of the dichroic beam splitter and configured to detect fluorescent light collected by the microscope objective.

2. The confocal scanning microscope as defined in claim 1, wherein the light exit of the fiber is embodied as a resonator mirror with a partially reflective coating.

3. The confocal scanning microscope as defined in claim 1, wherein the fiber is embodied as an up-conversion fiber laser that comprises a rare earth-doped core.

4. The confocal scanning microscope as defined in claim 3 wherein the active medium of the fiber laser comprises praseodymium-, erbium-, and/or thulium-doped heavy-metal fluoride glasses.

5. The confocal scanning microscope as defined in claim 3, wherein the active medium of the fiber laser comprises ZBLAN (53 $ZrF_4$-20 $BaF_2$-4 $LaF_3$-3 $AlF_3$-20 NaF) or ZBYA (50 $ZrF_4$-33 $BaF_2$-10 $YF_3$-7 $AlF_3$).

6. The confocal scanning microscope as defined in claim 1, wherein the core of the fiber has a diameter, configured in such a way that the light exiting from the light exit has a rotationally symmetrical beam profile.

7. The confocal scanning microscope as defined in claim 6, wherein the beam profile is a $TEM_{00}$.

8. The confocal scanning microscope as defined in claim 6 wherein said rotationally symmetrical beam profile is a Gaussian profile.

9. The confocal scanning microscope as defined in claim 1, wherein the light exit defines an aperture and wherein the aperture of the fiber laser is adapted to a microscope optical system.

10. The confocal scanning microscope as defined in claim 1, wherein the light source includes: a diode laser or a semiconductor laser or a solid-state laser or a gas laser and wherein the fiber laser is capable of emitting several wavelengths parallel or simultaneously.

11. The confocal scanning microscope as defined in claim 1, wherein means for selecting light of different wavelengths are provided.

12. The confocal scanning microscope as defined in claim 11, wherein the means for selecting is arranged between the fiber laser and the dichroic beam splitter.

13. The confocal scanning microscope as defined in claim 12, wherein the means for selecting acts in the resonator of the fiber laser.

14. The confocal scanning microscope as defined in claim 12, wherein the means for selecting is configured as a tiltable etalon or as a grating arrangement or as a birefringent plate.

15. The confocal scanning microscope as defined in claim 1, wherein an apparatus for compensating for light output fluctuation of the fiber laser is provided and regulates the light coupled into the fiber laser.

16. The confocal scanning microscope as defined in claim 15, wherein the apparatus for compensating comprises an AOTF, AOD, EOD, or an LCD (liquid crystal device) attenuator.

17. The confocal scanning microscope as defined in claim 1, wherein at least the light entrance or the light exit of the fiber is equipped with a fiber connector and wherein the fiber connector is standardized and is attachable directly to the microscope.

* * * * *